United States Patent
Li et al.

(10) Patent No.: US 11,406,961 B2
(45) Date of Patent: Aug. 9, 2022

(54) METAL-ORGANIC FRAMEWORK BASED MOLECULAR TRAPS FOR CAPTURE OF RADIOACTIVE ORGANIC IODIDES FROM NUCLEAR WASTE

(71) Applicant: Rutgers, The State University of New Jersey, New Brunswick, NJ (US)

(72) Inventors: Jing Li, Cranbury, NJ (US); Baiyan Li, East Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 500 days.

(21) Appl. No.: 16/472,987

(22) PCT Filed: Dec. 29, 2017

(86) PCT No.: PCT/US2017/068995
§ 371 (c)(1),
(2) Date: Jun. 24, 2019

(87) PCT Pub. No.: WO2018/190918
PCT Pub. Date: Oct. 18, 2018

(65) Prior Publication Data
US 2019/0329216 A1  Oct. 31, 2019

Related U.S. Application Data

(60) Provisional application No. 62/440,550, filed on Dec. 30, 2016.

(51) Int. Cl.
*B01J 20/22* (2006.01)
*B01J 20/28* (2006.01)
(Continued)

(52) U.S. Cl.
CPC ............ *B01J 20/226* (2013.01); *B01D 53/02* (2013.01); *B01J 20/2808* (2013.01); *B01J 20/28066* (2013.01); *B01J 20/28083* (2013.01); *B01J 20/3425* (2013.01); *B01J 20/3475* (2013.01); B01D 2253/204 (2013.01); B01D 2253/306 (2013.01); B01D 2253/308 (2013.01); B01D 2253/31 (2013.01); B01D 2257/2068 (2013.01); B01D 2259/40083 (2013.01)

(58) Field of Classification Search
None
See application file for complete search history.

(56) References Cited

U.S. PATENT DOCUMENTS

2014/0212944 A1  7/2014  Tian et al.
2014/0294709 A1  10/2014  Long et al.

OTHER PUBLICATIONS

Hwang et al., "Amine Grafting on Coordinatively Unsaturated Metal Centers of MOFs: Consequences for Catalysis and Metal Encapsulation." Angew. Chem. Int. Ed. (2008), vol. 47, pp. 4144-4148 (published online on Apr. 24, 2008) (incl. Supplementary Info.).*

(Continued)

*Primary Examiner* — Daniel Berns
(74) *Attorney, Agent, or Firm* — Fox Rothschild LLP

(57) ABSTRACT

Novel radioactive iodide molecular traps, in which one or more metal atoms are functionalized by coordinating to an amine containing two or more nitrogens, and methods of using the molecular traps to capture radioactive iodide.

20 Claims, 9 Drawing Sheets

(51) Int. Cl.
  *B01J 20/34*  (2006.01)
  *B01D 53/02*  (2006.01)
  *B01D 53/70*  (2006.01)
  *B01D 53/96*  (2006.01)

(56) References Cited

OTHER PUBLICATIONS

Li et al., "Incorporation of Alkylamine into Metal-Organic Frameworks through a Brønsted Acid-Base Reaction for CO2 Capture." ChemSusChem (2016), 9, pp. 2832-2840 (published online on Sep. 1, 2016) (incl. Supplementary Info.).*

Zhao et al., "High-yield, fluoride-free and large-scale synthesis of MIL-101(Cr)." Dalton Trans. (2015), vol. 44, pp. 16791-16801 (published online on Aug. 19, 2015) (incl. Supplementary Info.).*

Motkuri, et al: "Fluorocarbon Adsorptioin in Hierarchical Porous Frameworks", Jul. 9, 2014, vol. 5, [retrieved on Aug. 3, 2018], Retrieved from the internet: <URL:https://www.nature.com/articles/ncomms5368>.

Li, et al: "Capture of Organic Iodides from Nuclear Waste by Metal-Organic Framework-Based Molecular Traps", Nature Communications, Sep. 7, 2017, vol. 8. [retrieved on Aug. 3, 2018]. Retrieved from the Internet: <URL:https://www.ncbi.nlm.nih.gov/pmc/articles/PMC5589857/>.

* cited by examiner

METAL-ORGANIC FRAMEWORK BASED MOLECULAR TRAPS FOR CAPTURE OF RADIOACTIVE ORGANIC IODIDES FROM NUCLEAR WASTE

CROSS-REFERENCE TO RELATED APPLICATIONS

This application claims priority under 35 U.S.C. § 119(e) to U.S. Provisional Patent Application Ser. No. 62/440,550, filed on Dec. 30, 2016, which is hereby incorporated by reference in its entirety.

STATEMENT REGARDING FEDERALLY FUNDED RESEARCH

This invention was made in part with government support under Grant No. DE-FG02-08ER46491 awarded by the Department of Energy. The government has certain rights in the invention.

FIELD OF THE INVENTION

The present invention relates to the field of capture of radioactive organic iodides (ROI) from nuclear waste streams with metal-organic framework (MOF) materials.

BACKGROUND OF THE INVENTION

Currently, nuclear power provides ~11% of the world's electricity, offering a cost effective option compared to other energy sources. Rapidly increasing global energy needs will likely increase the demand for nuclear energy in the future. Under normal operating conditions, fuel rods used in nuclear power plants need to be reprocessed. This procedure involves the production of complex off-gas mixtures consisting of $HNO_3$, $NO_2$ and $N_2O_5$ along with radioactive molecular iodine ($I_2$) and organic iodides (ROIs, e.g. methyl iodide and ethyl iodide) at elevated temperatures (e.g. 150° C.). Radioactive I, and ROI species must be selectively captured and sequestered to ensure safe nuclear energy usage. ROI species are known to be particularly difficult to capture and thus tends to leak into the environment more easily. Among various current capture technologies, solid sorbent-based fixed-bed methods have proven superior due to their simplicity and relatively low cost. Examples of solid adsorbents for capturing ROIs from off-gas mixtures include triethylenediamine (TED), impregnated activated carbon (AC), and silver impregnated/exchanged solid supports such as silica, alumina and zeolites. Typically the temperature of the off-gas is about 150° C. in order to accelerate the chemical reactions and to remove adsorbed water from the narrow pores of the supports. Activated carbon (AC) based adsorbents, however, can only be used under 120° C. and are limited to specific applications absent of $NO_x$ because of low ignition temperatures and the risk of formation of explosive compounds. Silver functionalized porous materials are capable of performing at higher temperatures, but the high costs associated with the noble metal limits their widespread application. Additionally, much to their detriment, chemical adsorption of $CH_3I$—necessary for its high uptake at high temperature in such systems—makes the silver-based adsorbents poorly recyclable.

A need thus exists for safe and efficient capture of radioactive organic iodides.

SUMMARY OF THE INVENTION

The present invention meets such a need. Described herein are novel types of crystalline porous materials based on a metal-organic framework (MOF) as tunable and recyclable solid adsorbents for ROIs capture. These adsorbent materials are noble metal free, highly efficient, cost effective, recyclable, and safe to use in ROI capture. Furthermore, the adsorbent can be recycled multiple times without loss of capacity, making full recyclability a reality. This presents a major advance of today's capture technology as a fully recyclable system is unachievable by current industrial adsorbents. In combination with its excellent chemical and thermal stability, as well as its exceptionally high capture efficiency and low cost, the adsorbent demonstrates significant promise for industrial ROI capture from nuclear waste.

One aspect of the invention provides a compound having a formula of $M_3(O)X_b[(O_2C)-Y-(CO_2)]_3(Z)_a$. M is a transition metal with an oxidation state of +3 or +4. In some embodiments, the metal M is Cr, Mo, Fe, or Al having +3 oxidation state. In some embodiments, the metal M is Zr or Ti having +4 oxidation state. In some embodiments, one of the metal M is +4 oxidation state and the other M is of +3 transition state. Y is an optionally substituted aryl or heteroaryl. The $(O_2C)$ or $(CO_2)$ are each a carboxy substituent on Y. The optional substituents on Y include $-OR^1$, $-SR^1$, $-SR^1$, $-C_1-C_4$ alkyl, $-NO_2$, $-CN$ and $-NR^aR^b$, wherein $R^1$ at each occurrence is independently hydrogen (H) or $C_1-C_4$ alkyl, and $R^a$ and $R^b$ are independently hydrogen, or $C_1-C_4$ alkyl. X is an anion carrying one or two negative charges. Z is a neutral molecule coordinating to the open site of the metal. The subscript integer a is 1, 2 or 3. The subscript integer b is 1, 2 or 3.

In some embodiments, Y is an optionally substituted ring which can be an aryl (e.g. phenyl) or heteraryl (e.g. pyridinyl or pyrimidinyl). In some embodiments, X is F, OH, or another anion with one negative charge. In some embodiments, M is $Cr^{3+}$ and Y is phenyl.

The value of a and b depend on the oxidation state of M. In some embodiments, a is 2. In some embodiments, a is 2 and b is 1. In some embodiments, a is 1 and b is 2. In some embodiments, b is 2 and a is 2. In some embodiments, a is 3 and b is 0. In some embodiments, Z is a water molecule or an organic solvent molecule that can coordinate to M with a lone electron pair.

Another aspect of the invention provides a complex comprising
a) a compound of Formula $M_3(O)X_b[(O_2C)-Y-(CO_2)]_3(Z)_c$ wherein c is 0 or 1, b is 0, 1, or 2 and M, X, Y and Z are the same as described above, and
b) one, two or three nitrogen-containing functional molecules, wherein the functional molecules each contain at least two nitrogens, and one of the at least two nitrogens is coordinated to M. The functional molecule can only coordinate to the metal when at least an X or a Z is removed to free the binding site.

In some embodiments, the Z (e.g. $H_2O$ molecules) can be removed (to free the binding site) so that amine functional molecules can coordinate to the metals. In some embodiments, c is 0 and both Z molecules in the compound above are replaced with the nitrogen-containing functional molecules. In some embodiments, Z is $H_2O$.

In some embodiments, M is selected from the group consisting of Cr, Fe, or Al having +3 oxidation state, and Y is optionally substituted with a substituent selected from the group consisting of $-OR^1$, $-SR^1$, $-C_1-C_4$ alkyl, $-NO_2$, $-CN$ and $-NR^aR^b$, wherein $R^1$ at each occurrence is independently hydrogen (H) or $C_1-C_4$ alkyl, and $R^a$ and $R^b$ are independently hydrogen, or $C_1-C_4$ alkyl. In some embodiments, M is a group IV transition metal and X is phenyl. In some embodiments, the complex is a porous crystalline.

In some embodiments, each of the functional molecules independently have a formula of $R^1R^2NLNR^3R^4$, wherein, L is void or a $C_{1-4}$ linker optionally substituted with a $C_{1-4}$ alkyl; and each of $R^1$, $R^2$, $R^3$ and $R^4$ are independently selected from the group consisting of H, methyl, ethyl, propyl, and isopropyl, or $R^1$ and $R^3$ and/or $R^2$ and $R^4$ link up to form a $C_{2-4}$ alkyl chain, wherein each of the $C_{2-4}$ alkyl chain optionally and independently has a carbon replaced with a heteroatom or group selected from the group consisting of $NR^5$, S, and O, wherein $R^5$ is H or $C_{1-4}$ alkyl, or two $R^5$ link up to form a $C_{1-2}$ alkyl chain.

In some embodiments, L is void and each of $R^1$, $R^2$, $R^3$, and $R^4$ is independently H or methyl. In some embodiments, L is a $C_2$ linker. In some embodiments, L is a $C_2$ linker, and $R^1$ and $R^3$ link up to form a $C_2$ linker.

In some embodiments, the functional molecules each contain at least two tertiary amines. In some embodiments, the functional molecules each contains at least one tertiary amine and at least one primary or secondary amine. In some embodiments, the functional molecules are selected from the group consisting of triethylenediamine (TED), hexamethylenetetramine (HMTA), N,N-dimethylethylenediamine (DMEDA), N,N-dimethyl-1,3-propanediamine (DMPDA) and N, N-dimethyl-1,4-butanediamine (DMBDA).

In some embodiments, the complex has an average pore diameter greater than about 10 Å. In some embodiments, the complex has an average pore diameter between about 16 Å and 21 Å. In some embodiments, the complex is stable at a temperature above 150° C. for more than 10 hours.

In some embodiments, the complex has a Brunauer-Emmett-Teller (BET) surface area of greater than 2000 m$^2$ g$^{-1}$. In some embodiments, the complex has a Brunauer-Emmett-Teller (BET) surface area ranging from about 2200 m$^2$ g$^{-1}$ to about 3500 m$^2$ g$^{-1}$.

In some embodiments, the complex has an uptake capacity of more than about 50 wt % for methyl iodide. In some embodiments, the uptake capacity decreases by less than about 35% when relative humidity is increased from less than about 20% to more than about 70%. In some embodiments, the temperature is at room temperature, higher than about 40° C., higher than about 60° C., higher than about 80° C., higher than about 100° C., or higher than about 150° C.

In some embodiments, the complex has a decontamination factor of more than about 3500. In some embodiments, the complex retains more than about 95% of uptake capacity for the methyl iodide after at least three cycles.

Another aspect of the invention provides a method of removing radioactive iodide, by exposing the complex described herein to a substance containing a radioactive iodide.

In some embodiments, the radioactive iodide is methyl iodide. In some embodiments, the substance is collected from a source at a nuclear power plant. In some embodiments, the radioactive iodide forms an irreversible bonding with the complex.

In some embodiments, the substance has a temperature of above about 100° C. In some embodiments, the iodide is substantially uniformly dispersed in the complex when captured in the complex. In some embodiments, the substance is in an environment having a relative humidity of more than about 70%.

In some embodiments, the method further include treating the complex after capturing the radioactive iodide to regenerate the $M_3(O)X_b[(O_2C)-Y-(CO_2)]_3(Z)_a$.

DETAILED DESCRIPTION OF THE INVENTION

Various embodiments of the present invention provide novel types of highly efficient ROI molecular traps that are obtained via amine grafting to binding sites within a MOF framework. These highly efficient ROI molecular traps demonstrate a significantly improved uptake capacity for organic iodides in comparison with conventional approaches in ROI capture. In addition, they can be reused multiple times without a decrease in uptake capacity. Coupled with their high chemical and thermal stability, these molecular traps demonstrate the best performance for ROI capture materials reported to date and sets a new benchmark for the ROI capture technology.

Structurally, the ROI molecular traps described herein also feature the following advantages: (i) large and adjustable surface area and pore size enable accommodation of a large amount and a variety of ROI molecules and thus result in high and selective ROI loading capacity; (ii) modular nature allows for rational design and tailoring of structural topology and functional sites; (iii) multivariate syntheses offer possibilities for obtaining topologically identical yet functionally diverse crystalline frameworks; (iv) modifiable open metal sites (OMSs) that form reversible coordination bonds with amines provide an effective means for recyclability.

While the following text may reference or exemplify specific components of a complex or absorbent material, it is not intended to limit the scope of the invention to such particular references or examples. Various modifications may be made by those skilled in the art, in view of practical and economic considerations, such as the ligand and the method of preparing the compounds of the present invention.

The articles "a" and "an" as used herein refers to "one or more" or "at least one," unless otherwise indicated. That is, reference to any element or component of the present invention by the indefinite article "a" or "an" does not exclude the possibility that more than one element or component is present.

The term "about" as used herein refers to the referenced numeric indication plus or minus 10% of that referenced numeric indication.

The term "uptake capacity" is in weight percentage, namely the adsorbed weight amount of an adsorbed substance (e.g. $CH_3I$) per unit weight of MOF adsorbent (×100%).

The term "$C_{1-4}$ alkyl" includes alkyl of 1, 2, 3 or 4 carbons.

Figure 1:
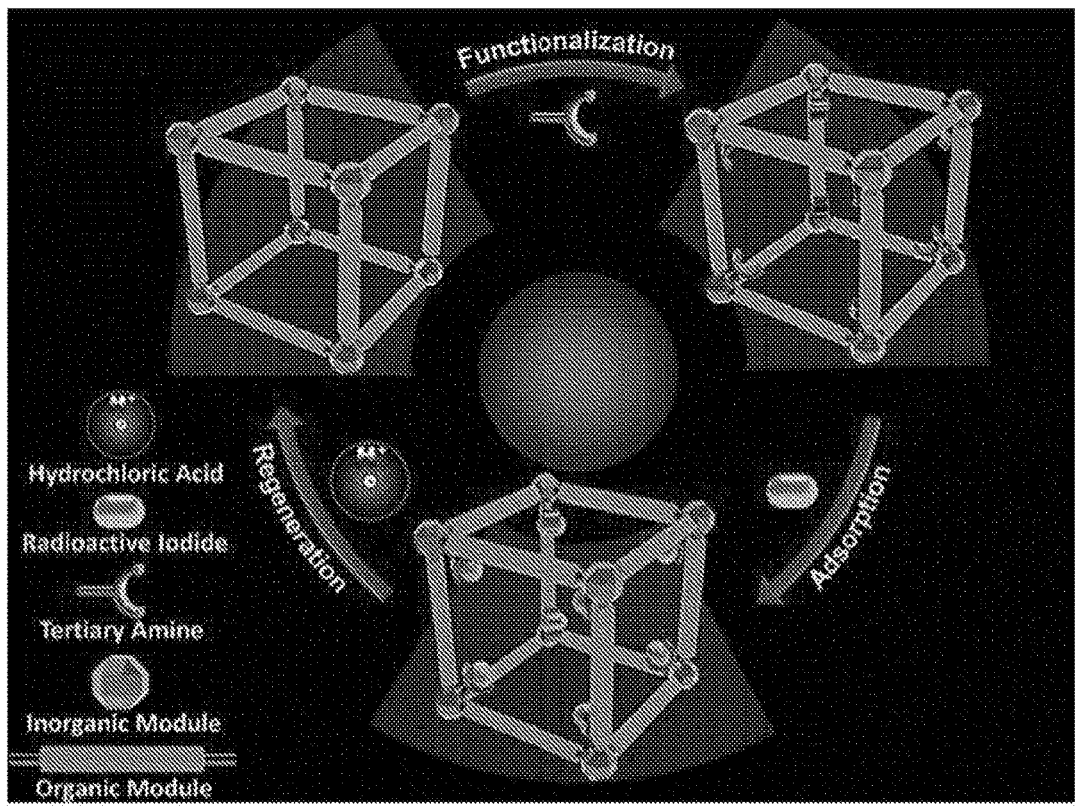
FIG. 1 illustrates the design of a recyclable MOF molecular trap for effective capture of radioactive organic iodides from nuclear waste.

The ROI molecular traps generally contain a transition metal-containing (MOF) compound coordinated/complexed to a nitrogen-containing molecule. In some embodiments, the crystalline structures of compounds remain intact after the complexation between the transition metal to the amine. As illustrated in FIG. 1, the ROI traps can be constructed by functionalization of a transition metal-containing compound with an amine. The resulting complex has the amines aligned in a certain configuration inside the porous crystalline structure and entraps ROI through the formation of a quaternary salts.

The transition metal-containing compound, prior to coordinating to one or more functional molecules to form a complex as a ROI trap, can be represented with the following formula: $M_3(O)X_b[(O_2C)—Y—(CO_2)]_3(Z)_a$. In some embodiments, M is a group IV, V or VI transition metal with an oxidation state capable of coordinating to an amine. In some embodiments, M is a transition metal with an oxidation state of +3 or +4. In some embodiments, the metal is Cr, Mo, Zr, Fe, or Al having +3 oxidation state. In some embodiments, the metal M is Zr or Ti having +4 oxidation state. The subscript "a" is 0, 1 or 2. The subscript "b" is 0, 1 or 2. In some embodiments, a is 2 and b is 1. Each X in $X_b$ can be the same or different. Each Z in $(Z)_a$ can be the same or different.

In some embodiments, each M in the compound is a metal of +3 oxidation state. In some embodiments, one M in the compound is a metal of +4 oxidation state, the other M in the compound are each a metal of +3 oxidation state, X is an anion of two negative charges. In some embodiments, one M in the compound is a metal of +4 oxidation state, the other M in the compound are each a metal of +3 oxidation state, and the compound contains two anions of one negative charge.

In some embodiments, a is 2. In some embodiments, a is 2 and b is 1. In some embodiments, a is 1 and b is 2. In some embodiments, a is 3 and b is 0. In some embodiments, Z is a water molecule or an organic solvent molecule that can coordinate to M with a lone electron pair.

In some embodiments, M is Cr. In some embodiments, M is Cr, a is 2 and b is 1. In some embodiments, Z is $H_2O$. In some embodiments, M is Cr and X is phenyl. In some embodiments, X is an anion of one negative charge, b is 1 and a is 2.

Y is an optionally substituted aryl (e.g. phenyl, naphthyl) or heteraryl (e.g. pyridinyl or pyrimidinyl). The optional substituents include, for example, halogens, $—OR^1$, $—SR^1$, $—SR^1$, $—C_1-C_4$ alkyl, $—NO_2$, $—CN$ and $—NR^aR^b$, wherein $R^1$ at each occurrence is independently hydrogen (H) or $C_1-C_4$ alkyl, and $R^a$ and $R^b$ are independently hydrogen or $C_1-C_4$ alkyl. The ($O_2C$) or ($CO_2$) are each a carboxy substituent on Y. X is an anion carrying one or two negative charges. In some embodiments, X is F, OH, or an anion with one negative charge.

ROI traps of the present invention generally derives from the above described compound complexed to one or more nitrogen-containing functional molecules through the coordination of the metal atom (M) to the nitrogen at OMS. It is noted that some metal sites are fully coordinated and are not available for coordination with nitrogen. Only open metal sites are capable of coordination to nitrogen. The functional molecule contains at least two nitrogens. While one of the nitrogens is involved in the coordination to the metal, the other forms quaternary ammonium salt with an organic iodide, thereby effectively trapping the radioactive material.

Therefore, when a complex is formed, one or more of Z and/or X are replaced by the functional molecules. The complex is represented by the formula $M_3(O)X_b[(O_2C)—Y—(CO_2)]_3(Z)_c$ wherein the subscript c is 0 or 1 and b is 0 or 1. In some embodiments of the complex, subscript c is 0 and subscript b is 1. In some embodiments of the complex, subscript c is 1 and subscript b is 1. In some embodiments, c is 0 and b is 2 in the complex. In some embodiments, Y is phenyl and the two carboxy groups on Y are positioned para to each other. In some embodiments, M is $Cr^{3+}$, Y is phenyl, c is 0 and b is 1. Each X in $X_b$ can be the same or different. In some embodiments, X is Fluoride or OH. In some embodiments, X is an anion of two negative charges and one of the metals (M) is of +4 oxidation state.

In some embodiments, each M in the complex is a metal of +3 oxidation state, and the complex contains one anion X of one negative charge. In some embodiments, one M in the complex is a metal of +4 oxidation state, the other M in the complex are a metal of +3 oxidation state, b is 1 and X is an anion of two negative charges. In some embodiments, one M in the complex is a metal of +4 oxidation state, the other M in the complex are each a metal of +3 oxidation state, and the complex contains two anions each of one negative charge.

Z is a molecule coordinating to the open site of the metal. Each Z in $(Z)_c$ can be the same or different. Examples of Z includes water, acetonitrile, dimethylformamide (DMF) or other organic molecules capable of coordinating to the metal and being replaced with an amine-containing functional molecule.

One, two, or three functional molecule can coordinate to one of more metal M in the complex. The functional molecule can be represented by a formula of $R^1R^2NLNR^3R^4$. L is void or a $C_{1-4}$ linker optional substituted with a $C_{1-4}$ alkyl. Each of $R^1$, $R^2$, $R^3$, and $R^4$, are independently selected from the group consisting of H, methyl, ethyl, propyl, and isopropyl. The pair of $R^1$ and $R^3$ and/or the pair of $R^2$ and $R^4$ link up to form a $C_{2-4}$ alkyl chain or bridge, wherein each of the $C_{2-4}$ alkyl chain optionally has a carbon replaced with a heteroatom selected from the group consisting of $NR^5$, S, and O. Each $R^5$ is independently H or $C_{1-4}$ alkyl. Alternatively, two $R^5$ link up to form a $C_{1-2}$ alkyl chain or bridge. In some embodiments, both pairs of "$R^1$ and $R^3$" and "$R^2$ and $R^4$" link up to form a $C_2$ alkyl chain or bridge.

In some embodiments, L is void and each of $R^1$, $R^2$, $R^3$, and $R^4$ is independently H or methyl. Examples include $NH_2NH_2$, $NHMeNHMe$, and $NMe_2NMe_2$.

In some embodiments, L is a $C_2$ linker. $R^1$ and $R^3$ can link up to form a $C_2$ linker or bridge. Similarly, $R^2$ and $R^4$ can link up to form a $C_2$ linker or bridge. Non-limiting examples of the functional molecules include trimethylene-diamine (TED), hexamethylenetetramine (HMTA), N,N-dimethyl-ethylenediamine (DMEDA), N,N-dimethyl-1,3-propanediamine (DMPDA) and N, N-dimethyl-1,4-butanediamine (DMBDA).

The functional molecule can contain a primary amine, a secondary amine and/or a tertiary amine. In some embodiments, the functional molecule contains at least two tertiary amines. In some embodiments, the functional molecule contains at least one tertiary amine and at least one primary or secondary amine. Non-limiting examples include N,N-dimethylethylenediamine (DMEDA), N,N-dimethyl-1,3-propanediamine (DMPDA), and N,N-dimethyl-1,4-butanediamine (DMBDA). Additional examples include $NH_2(CH_2)nNMe_2$, wherein n is 0, 1, 2, 3 or 4.

As confirmed in various experiments, the resulting complex demonstrates a crystalline structure consistent with that of the pre-coordination compound. The pore diameter of the crystalline structure is large enough for effective mass transfer during nuclear waste reprocessing. In some embodiments, the average pore diameter ranges from about 5 Å to about 30 Å, from about 10 Å to about 25 Å, from about 10 Å to about 22 Å, from about 12 Å to about 25 Å, from about 15 Å to about 25 Å, from about 15 Å to about 22 Å, from about 16 Å to about 22 Å, from about 16 Å to about 20 Å, or from about 18 Å to about 20 Å. In some embodiments, the average pore diameter is greater than about 5, 8, 10, 12, 14, 16, 18, 20, 22, 24, or 26 Å. The complex described herein also features a higher Brunauer-Emmett-Teller (BET) surface area than other benchmark porous materials. In some embodiments, the complex has a Brunauer-Emmett-Teller (BET) surface area of greater than about 2000 $m^2 g^{-1}$, 2200 $m^2 g^{-1}$, 2400 $m^2 g^{-1}$, 2600 $m^2 g^{-1}$, 2800 $m^2 g^{-1}$, 3000 $m^2 g^{-1}$, 3200 $m^2 g^{-1}$, 3400 $m^2 g^{-1}$, 3600 $m^2 g^{-1}$, 3800 $m^2 g^{-1}$, or 4000 $m^2 g^{-1}$. In some embodiments, the complex has a Brunauer-Emmett-Teller (BET) surface area ranging from about 2000 to about 4000 $m^2 g^{-1}$, from about 2000 to about 3600 $m^2 g^{-1}$, from about 2000 to about 3400 $m^2 g^{-1}$, from about 2000 to about 3200 $m^2 g^{-1}$, from about 2000 to about 3000 $m^2 g^{-1}$, from about 2200 to about 3600 $m^2 g^{-1}$, from about 2200 to about 3400 $m^2 g^{-1}$, from about 2400 to about 3400 $m^2 g^{-1}$, from about 2400 to about 3200 $m^2 g^{-1}$, from about 2400 to about 3000 $m^2 g^{-1}$, or from about 2600 to about 3000 $m^2 g^{-1}$.

As a result of its large porosity and high surface area, the uptake capacity of the complex is significantly higher than conventionally used ROI absorbents. In some embodiments, the capacity is more than about 40 wt %, more than about 45 wt %, more than about 50 wt %, more than about 60 wt %, more than about 65 wt %, more than about 70 wt %, more than about 75 wt %, more than about 80 wt %, or more than about 85 wt % at a temperature of higher than about 100° C., higher than about 150° C., higher than about 200° C., higher than about 250° C., higher than about 300° C., higher than about 350° C., higher than about 400° C., or higher than about 500° C.

While many of the conventional capturing agents suffer a drastic decrease of uptake capacity at high humidity environment, the complex of the present invention has a much smaller drop in uptake capacity. In some embodiments, the uptake capacity decreases by less than about 30%, less than about 35%, less than about 40%, less than about 45%, or less than about 50% when relative humidity is increased from less than about 20% to more than about 70% or more than about 80%.

The decontamination factors (DFs) of $CH_3I$ obtained under simulated reprocessing conditions reach a range significantly higher than that of the facility regulatory requirement (DF=3000). In some embodiments, the complex of the present invention has a DF of more than about 300, more than about 3500, more than about 3700, more than about 4000, more than about 4500, more than about 5000.

In some embodiments, the complex of the present invention forms a partially reversible bonding with radioactive iodide. In some embodiments, the adsorption or desorption of ROI is not reversible. In some embodiments, full reversibility occurs between OMS of the metal and N of the amines during recycle process, which regenerates MOF (e.g. MIL-101-Cr) after removal of amines attached to ROI (e.g. $CH_3I$). The complex is also superior over conventional ROI absorbents in terms of its recyclability. In some embodiments, the complex retains at least about 70%, at least about 80%, at least about 90%, at least about 95%, at least about 99%, or about 100% of the uptake capacity after being recycled 1, 2, 3, 4, 5, 6, 7 or more times.

Also provided herein is a method of capturing radioactive iodides. The method includes contacting the complex of the present invention with a substance containing a radioactive iodide. The method is particularly efficient in capturing organic iodides due to the formation of quaternary ammonium salt. Of course, one or more of the nitrogen in tertiary amines of the complex may react with the organic iodide. For example, when the functional molecule is HMTA, 1, 2, or 3 nitrogen may each form a quaternary ammonium salt with the organic iodide.

The organic iodide can have a C1 to C10 alkyl chain, which is linear or branched and optionally substituted with one or more heteroatoms. Examples of the organic group include methyl, ethyl, propyl, isopropyl, isobutyl, butyl, pentyl, isopentyl, and hexyl.

The radioactive iodide can be captured by physisorption and chemisorption. In some embodiments, more than about 70%, more than about 80%, or more than about 90% or substantially all the captured iodide is by chemisorption means, where the radioactive iodide forms an irreversible bonding with the amine of the complex. In some embodiments, the captured iodide is substantially uniformly dispersed in the complex.

The source of the iodides includes, for example, nuclear power plants, research labs, and other industry facilities. The stability of the complex allows it to be employed in high temperature environment. For example, the temperature of the iodide-containing substance can be more than about 100° C., more than about 150° C., more than about 200° C., more than about 250° C., or more than about 300° C. In some embodiments, the substance is in an environment having a relative humidity of more than about 50%, more than about 60%, more than about 70%, or more than about 80%.

The complex after capturing the iodide can be recycled to regenerate the $M_3(O)X[(O_2C)-Y-(CO_2)]_3(H_2O)_a$, which upon coordination to the amine will form the complex again. As explained above, the complex can be recycled multiple times and retain the uptake capacity. The removal the iodide from the complex can be achieved by any method known in the art. For example, the complex can be treated with an acid (e.g. hydrochloric acid) to regenerate the compound.

EXAMPLES

Example 1

Highly efficient ROI molecular traps were obtained via tertiary amine grafting to binding sites within a MOF framework. One such designed molecular trap, MIL-101-Cr-TED, exhibits an exceptionally high uptake capacity of 71 wt % for methyl iodide at 150° C. Under identical capture conditions, this performance is more than 340% higher than that of the industrial adsorbent Ag⁰@MOR, a leading material in the United States for ROI capture. Furthermore, it can be reused multiple times without a decrease in uptake capacity. Coupled with its high chemical and thermal stability, high capture efficiency and lower cost, MIL-101-Cr-TED demonstrates the best performance for ROI capture materials reported to date and sets a new benchmark for the current ROI capture technology. It was shown that the construction and optimization of such molecular traps can be generalized by a suitable combination of a MOF with a tertiary amine molecule, which leads to an unlimited choice of structures. This strategy thus paves the way for further research and advancement on MOF-based molecular traps for their ultimate utility in ROI capture from nuclear waste.

Figure 2:
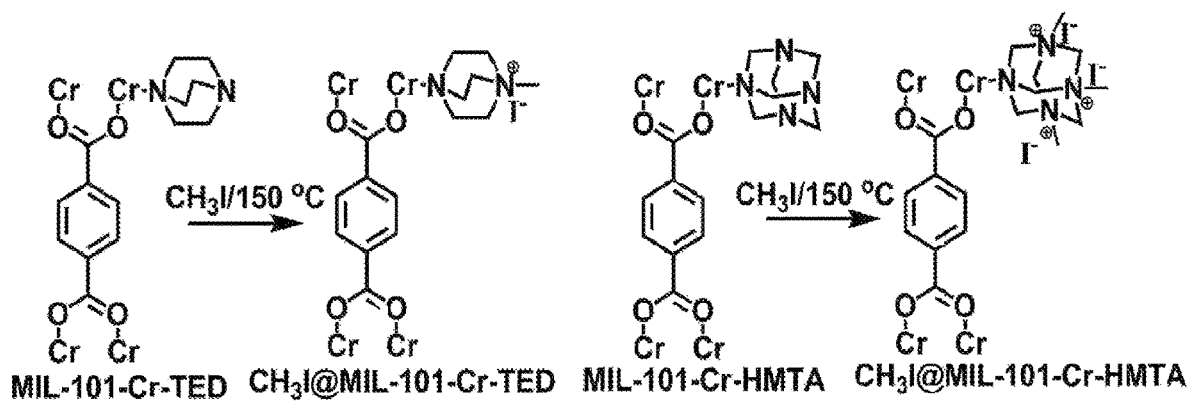
FIG. 2 illustrates the synthetic route to MIL-101-Cr-TED (left) and MIL-101-Cr-HMTA (right).

To construct high performance molecular traps for capturing organic iodides, MIL-101-Cr was chosen as a model support material because of its large surface area (>3300 m² g⁻¹), high acid and moisture stability, thermal stability (stable up to ~300° C.), and relatively low cost. Two tertiary amines, triethylenediamine (TED) and hexamethylenetetramine (HMTA), were selected as functional molecules for post-synthetic modification (PSM) of the MOF framework. Both species can use a single nitrogen to bind to the OMSs on the Cr trinuclear secondary building unit (SBU) of MIL-101-Cr, with the remaining nitrogen atoms available as binding sites for organic iodides (FIG. 2). MIL-101-Cr-TED and MIL-101-Cr-HMTA were obtained by stirring MIL-101-Cr with TED or HMTA in benzene or chloroform at 110° C. for 24 h in a re-sealed flask under nitrogen atmosphere. Transmission electron microscopy (TEM) images of both functionalized MOFs show similar crystal morphology when compared to as-made MIL-101-Cr, suggesting retention of crystallinity and morphology after amine functionalization.

Synthetic route for the preparation of MIL-101-Cr-DMEDA (n=2), MIL-101-Cr-DMPDA (n=3), and MIL-101-Cr-DMBDA (n=4):

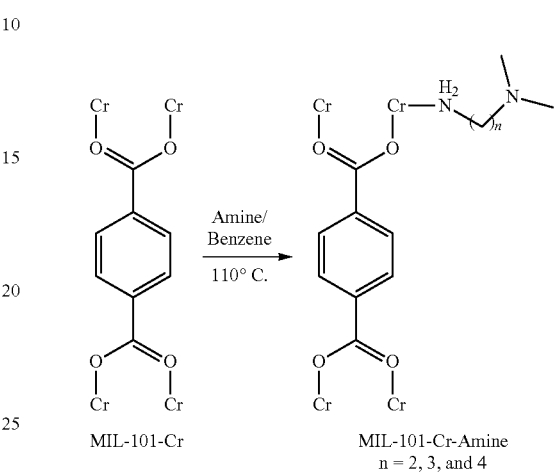

Figure 3:
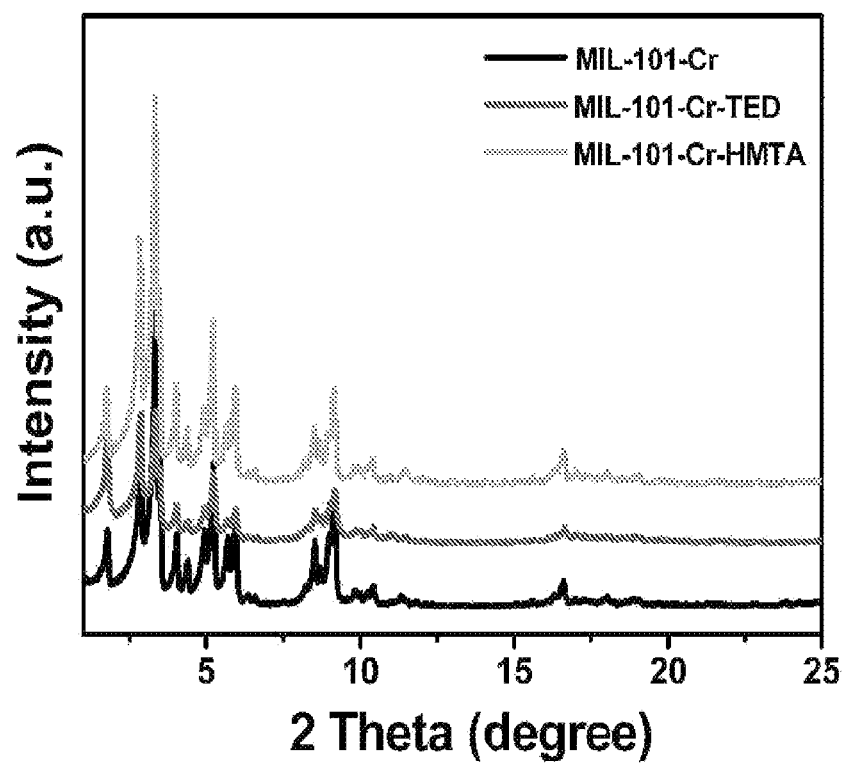
FIG. 3 illustrates the PXRD patterns of MIL-101-Cr, MIL-101-Cr-TED and MIL-101-Cr-HMTA.

The successful grafting of tertiary amine groups onto MIL-101-Cr was confirmed by powder X-ray diffraction (PXRD), Fourier transform infrared (FT-IR) spectroscopy, X-ray photoelectron spectroscopy (XPS), solid-state ¹H NMR and elemental analysis. PXRD analysis shows that the diffraction profiles are unchanged after amine functionalization (FIG. 3), indicating that the crystal structure of the functionalized material remains intact. Elemental analysis reveals a nitrogen content of 6.38 wt % and 12.15 wt % for MIL-101-Cr-TED and MIL-101-Cr-HMTA, respectively. This is equivalent to ~⅔ TED or HMTA molecules grafted to each Cr, which is consistent with the previous report of two available open metal sites on each Cr₃O cluster (2:3).

Figure 4:
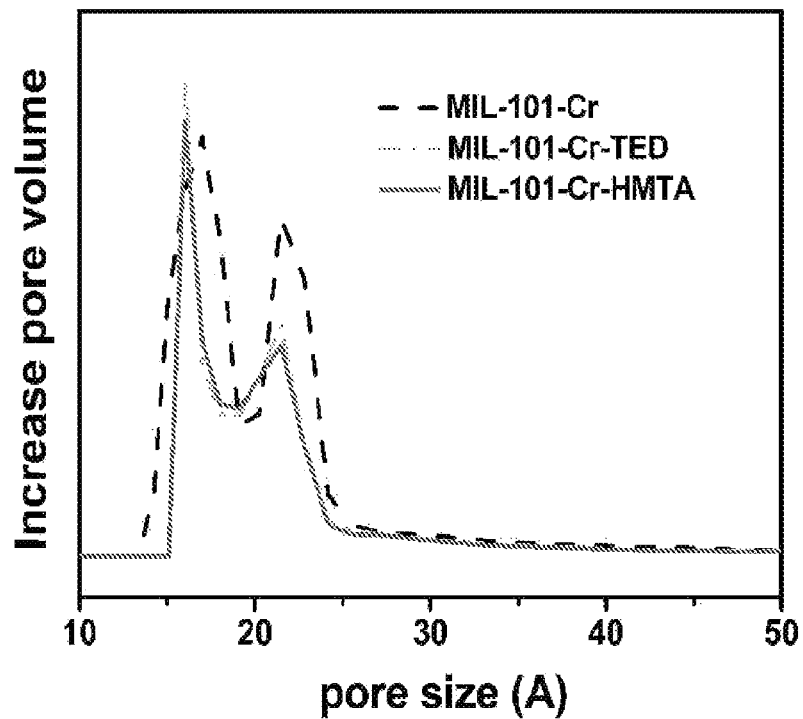
FIG. 4 illustrates BJH pore size distribution in MIL-101-Cr, MIL-101-Cr-TED and MIL-101-Cr-HMTA calculated from nitrogen adsorption isotherms at 77 K.

Nitrogen gas adsorption-desorption isotherms collected at 77 K indicate that the modification of TED and HMTA molecules onto MIL-101-Cr leads to a decrease in the Brunauer-Emmett-Teller (BET) surface area from 3342 m² g⁻¹ to 2282 m² g⁻¹ and 2272 m² g⁻¹ for MIL-101-Cr-TED and MIL-101-Cr-HMTA, respectively. Despite such decreases, the surface areas of the two amine-functionalized samples are significantly higher than any other benchmark porous materials, which usually exhibit moderate surface areas of ~300-1000 m² g⁻¹. Based on the pore size distribution (FIG. 4), both MIL-101-Cr-TED and MIL-101-Cr-HMTA have pore diameters of about 16 Å and 21 Å, which are large enough for effective mass transfer during nuclear waste reprocessing.

Thermogravimetric analysis (TGA) showed that MIL-101-Cr-TED and MIL-101-Cr-HMTA are stable up to 280 and 220° C., respectively. Isothermal TG analysis of amine grafted MIL-101-Cr samples clearly show that both TED and HMTA remain attached to the framework without losing mass upon prolonged heating at 150° C. for 12 h. The high thermal stability of the two compounds enables their use at the elevated working temperature (150° C.) required for nuclear waste treatment. The calculations also show that the TED and HMTA bind significantly more strongly to the OMSs compared to $H_2O$ molecules, further suggesting the feasibility of their application under humid conditions. The large surface area coupled with the high thermal and chemical stability of both MIL-101-Cr-TED and MIL-101-Cr-HMTA makes it highly feasible to evaluate their performance as molecular traps for the removal of ROIs from off-gas mixtures.

Figure 5:
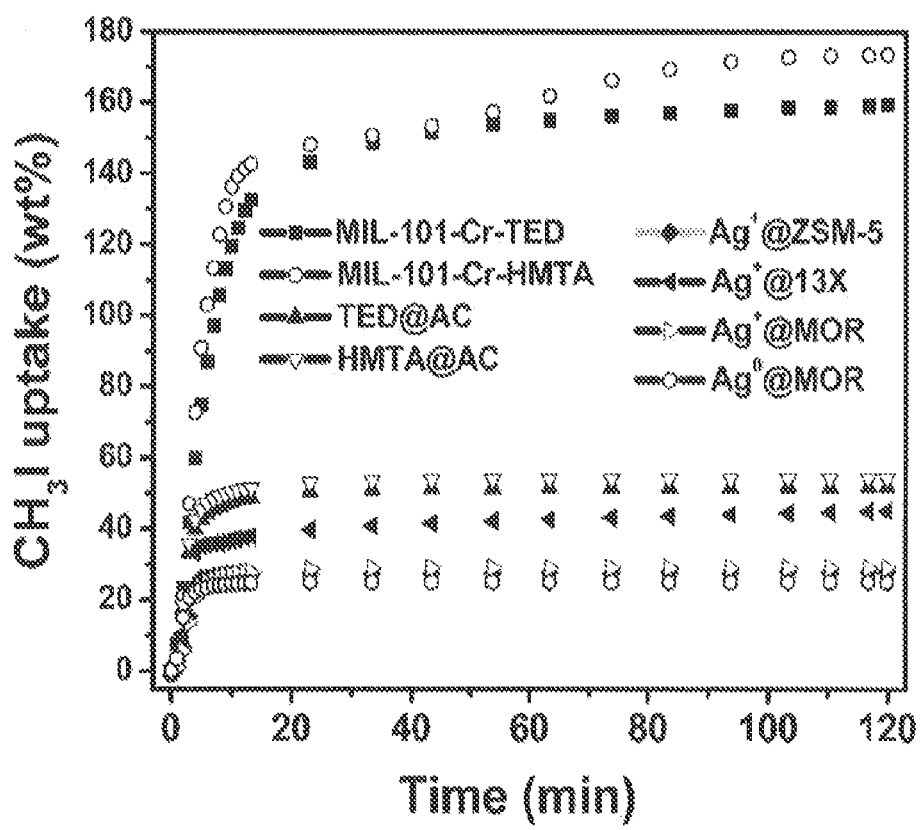
FIG. 5 illustrates adsorption isotherms of $CH_3I$ in MIL-101-Cr-TED, MIL-101-Cr-HMTA and selected benchmark sorbent materials collected at 30° C. with a $CH_3I$ partial pressure of 0.2 atm.
Figure 6:
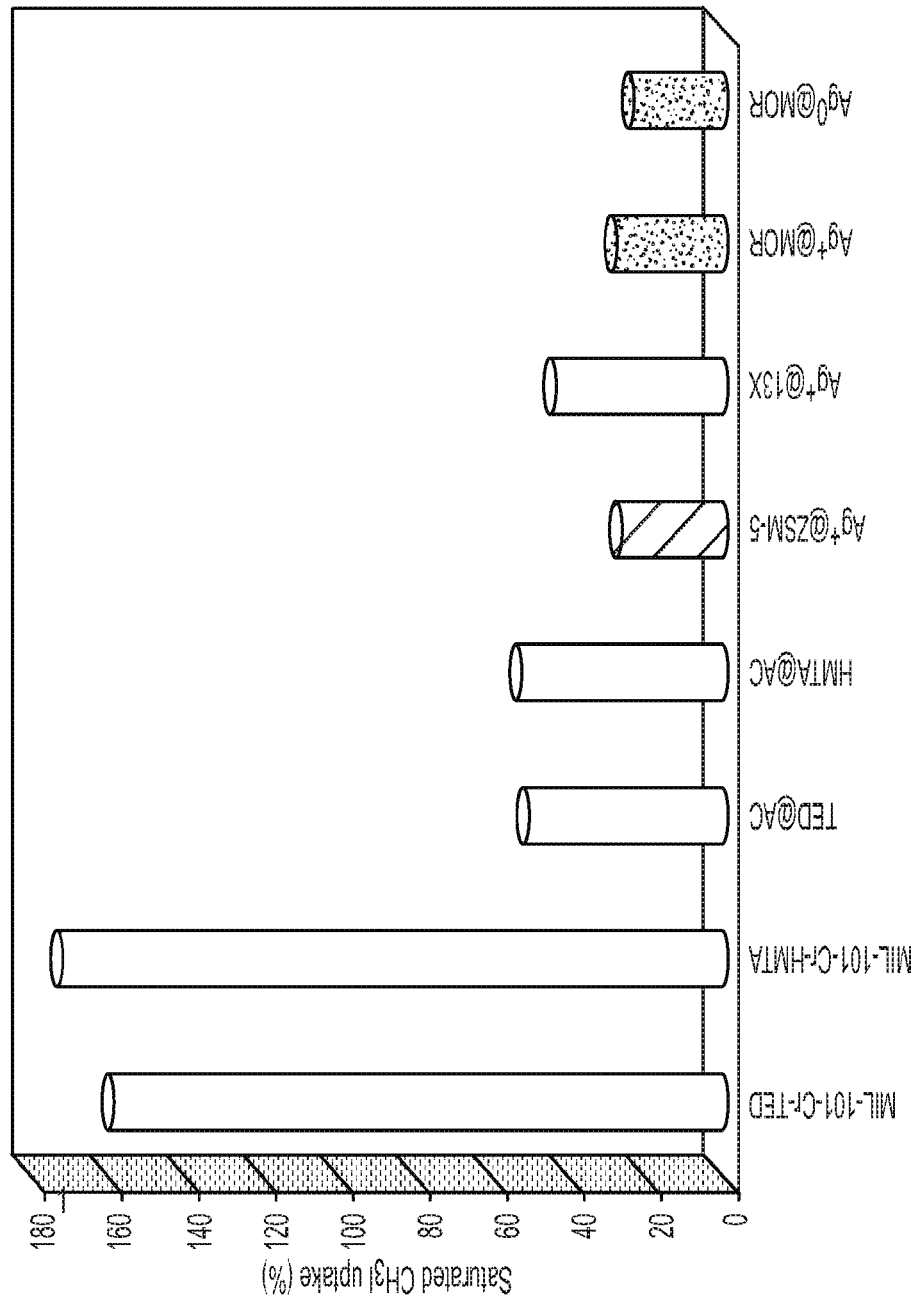
FIG. 6 illustrates saturated $CH_3I$ uptake in MIL-101-Cr-TED, MIL-101-Cr-HMTA and selected benchmark sorbent materials at 30° C. with a partial pressure of 0.2 atm for $CH_3I$.

To evaluate the performance of MIL-101-Cr-TED and MIL-101-Cr-HMTA for ROIs capture, as-made samples (~20 mg of each) were placed in a thermogravimetric analyzer and a $CH_3I$ steam with partial pressure of 0.2 atm was passed through the sample cell using $N_2$ as a carrier gas. The adsorption amount was monitored by recording sample mass as a function of time. As shown in FIG. 5, MIL-101-Cr-TED and MIL-101-Cr-HMTA rapidly absorb 120 and 136 wt % $CH_3I$ within 10 min at 30° C. and reach their maximum uptake amount of 160 and 174 wt % by 120 min, respectively. The absorption amounts are significantly higher than all benchmark materials used for $CH_3I$ adsorption under the same conditions, such as TED- and HMTA-impregnated activated carbon (TED@AC and HMTA@AC) and silver functionalized zeolites [including ZSM-5, 13X and mordenite ($Ag^+$@ZSM-5, $Ag^+$@13X, $Ag^+$@MOR and $Ag^0$@MOR) with $CH_3I$ uptake amounts of 52, 54, 28, 45, 29, and 25 wt %, respectively (FIG. 6)].

Figures 7A, 7B:
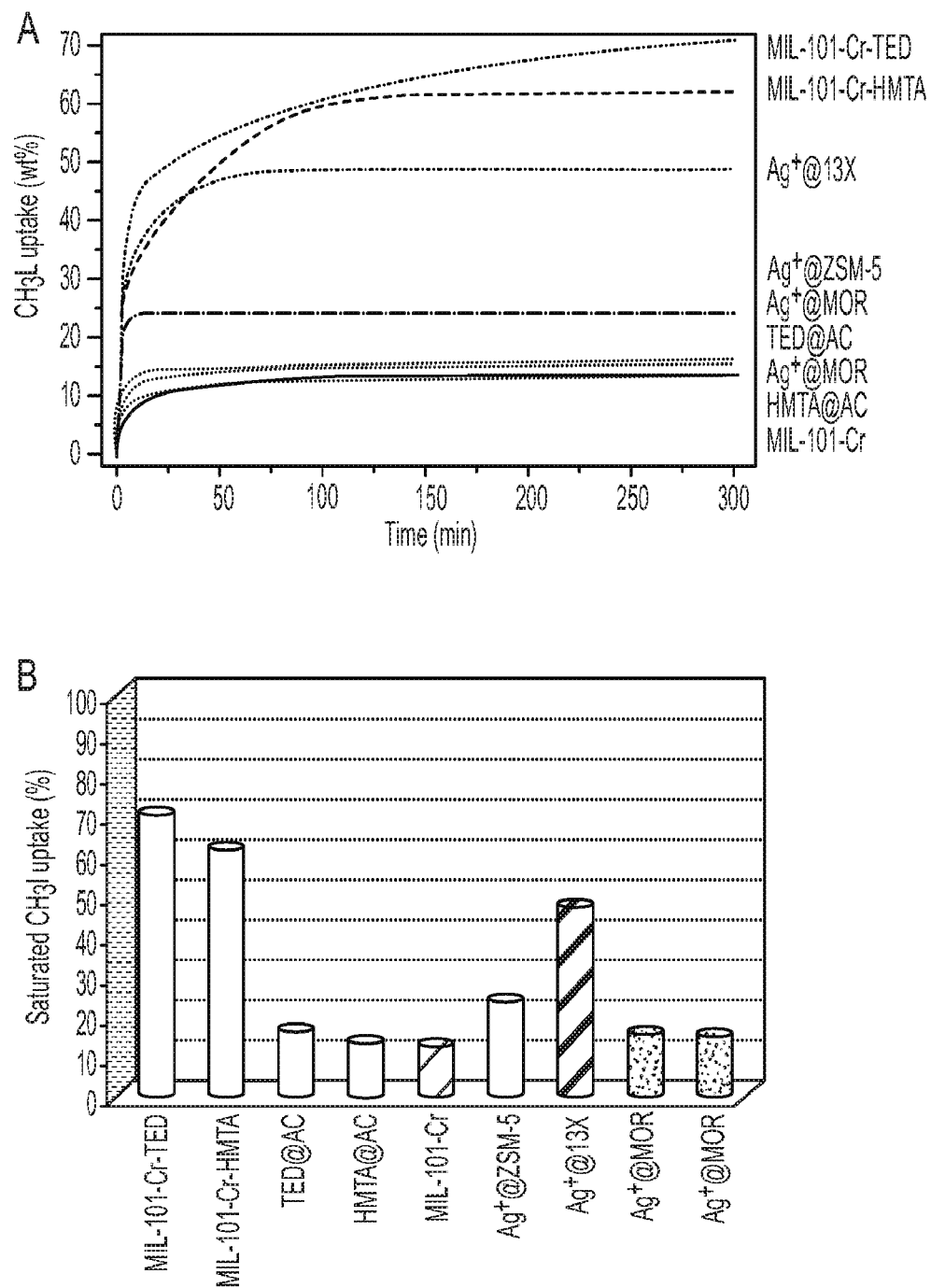
FIG. 7 illustrates the $CH_3I$ capture performance. (A) Sorption isotherms of $CH_3I$ in MIL-101-Cr-TED, MIL-101-Cr-HMTA and selected benchmark sorbent materials at 150° C. with partial pressure of 0.2 atm for $CH_3I$. (B) Comparison of the saturated $CH_3I$ uptake in MIL-101-Cr-TED, MIL-101-Cr-HMTA and selected benchmark sorbent materials at 150° C. with partial pressure of 0.2 atm for $CH_3I$. (C) The $CH_3I$ uptake at 150° C. under dry and humidity (RH=81%) conditions by breakthrough experiment (back row: dry conditions; front row: humid conditions), (Insert) the uptake drop ratio by comparing the $CH_3I$ uptake of dry and humid conditions. (D) Decontamination factors of $CH_3I$ by MIL-101-Cr-TED under simulated conditions representing gas mixtures produced during $CH_3I$ reprocessing, which include $H_2O$, $HNO_3$, $NO_2$, and NO at 150° C. (E) The recyclability of MIL-101-Cr-TED for $CH_3I$ capture.

Since the capture of organic iodides from off-gas mixtures is typically performed at elevated temperatures (~150° C.), the $CH_3I$ uptake capacity was tested at 150° C. for both samples and several benchmark materials. At this temperature, the maximum uptake amounts at 0.2 atm are 71 and 62 wt % for MIL-101-Cr-TED and MIL-101-Cr-HMTA, respectively (FIG. 7A). These values are 4.4 and 3.9 times that of $Ag^0$@MOR (16 wt %), a leading adsorbent material for capturing ROIs in the US nuclear fuel reprocessing industry. We also compared the performance of MIL-101-Cr-TED with $Ag^+$@13X, a zeolite with the highest silver content. $Ag^+$@13X has a higher $CH_3I$ uptake amount (max. 48 wt %) compared to $Ag^0$@MOR, but its low acid resistance presents a serious drawback. MIL-101-Cr-TED adsorbs 1.5 times more $CH_3I$ than $Ag^+$@13X under identical conditions. The capture capacity of MIL-101-Cr-TED is also much higher than the other benchmark materials such as TED@AC, HMTA@AC, $Ag^+$@ZSM-5, and $Ag^+$@MOR, with uptake amounts of 17, 14, 24, and 16 wt %, respectively (FIG. 7B). Compared to the performance of pristine MIL-101-Cr ($CH_3I$ uptake: 13 wt %), TED functionalization leads to a remarkable increase of ~5.5 times. Based on these comparisons, MIL-101-Cr-TED clearly ranks as the top candidate for adsorbent-based capture and removal of ROIs during nuclear fuel reprocessing. The exceptionally high uptake capacity of tertiary amine functionalized MIL-101-Cr can be attributed to two main factors: (a) relatively high surface area of the adsorbent after functionalization, and more importantly, (b) effective grafting of TED and HMTA onto the MOF pore surface (via OMSs) creating molecular traps that offer greatly enhanced bonding interactions toward organic iodides.

Figure 7C:
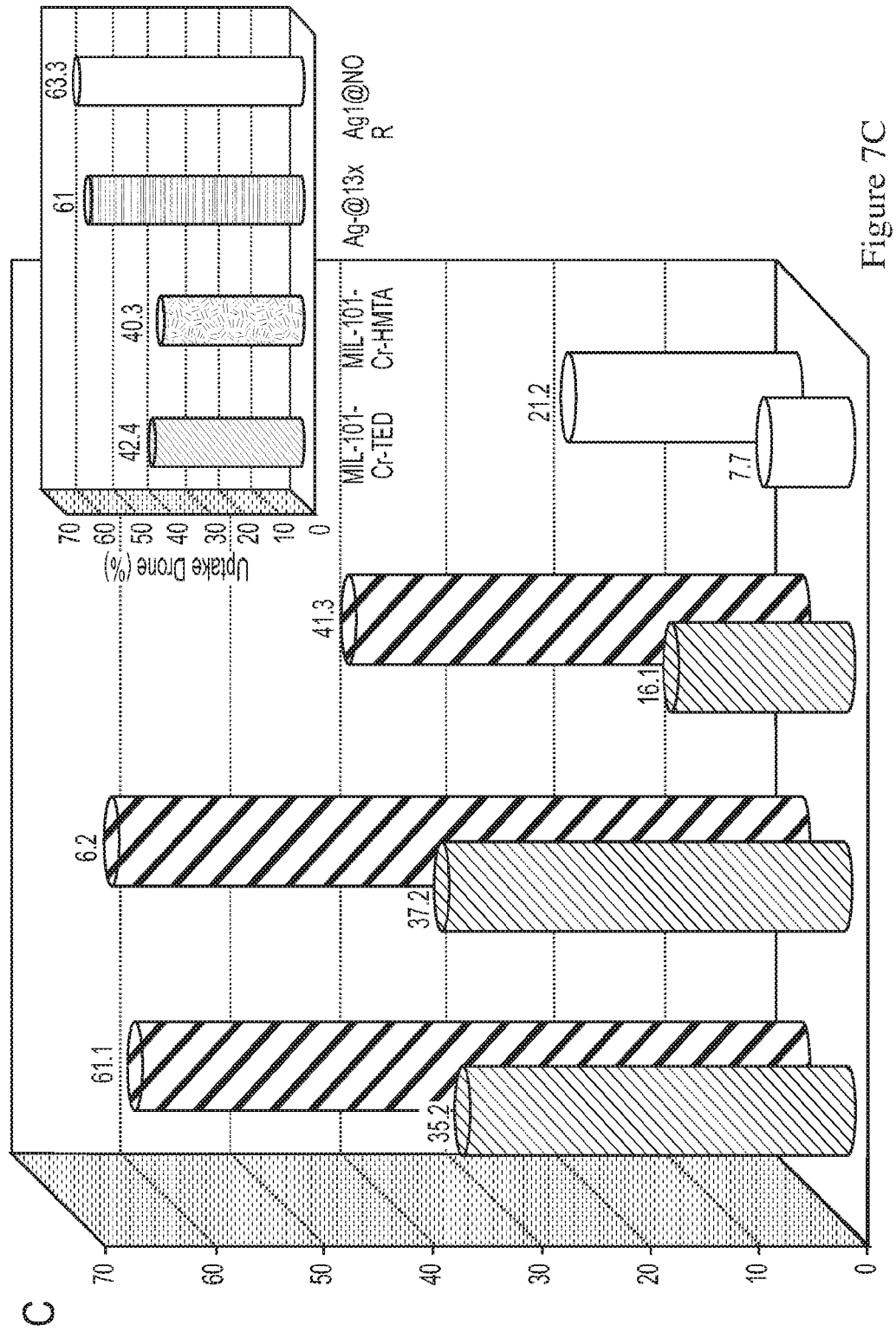

To assess the influence of humidity on the organic iodide uptake capacity, a crucial aspect for a sorbent's performance metrics in real-world applications, column breakthrough tests were performed at 150° C. under both dry and humid conditions (RH=81% at 23° C.). For $Ag^+$@13X, the zeolite with the best performance to date, the uptake drops from 41.3 to 16.1 wt %, a significant decrease of 61% (FIG. 7C and FIG. 7C insert). A dramatic decrease was observed of 63.7% for $Ag^0$@MOR, with an uptake of 21.2 wt % under dry conditions and 7.7 wt % under humid conditions. For MIL-101-Cr-TED and MIL-101-Cr-HMTA, however, the extent of decrease is much smaller (42.4% and 40.8%, respectively). Based on the breakthrough data, the uptake capacities of MIL-101-Cr-TED and MIL-101-Cr-HMTA are 2.2 and 2.3 times higher than that of $Ag^+$@13X, and 4.6 and 4.8 times greater than $Ag^0$@MOR at 150° C. under humid conditions, underscoring the robustness of MIL-101-Cr-TED and MIL-101-Cr-HMTA adsorbents in humid environments. The higher hydrophilicity of zeolites compared to MOF materials may account for this difference, which makes MOFs are an advantageous platform for $CH_3I$ adsorption over conventional silver functionalized zeolites.

Figures 7D, 7E:
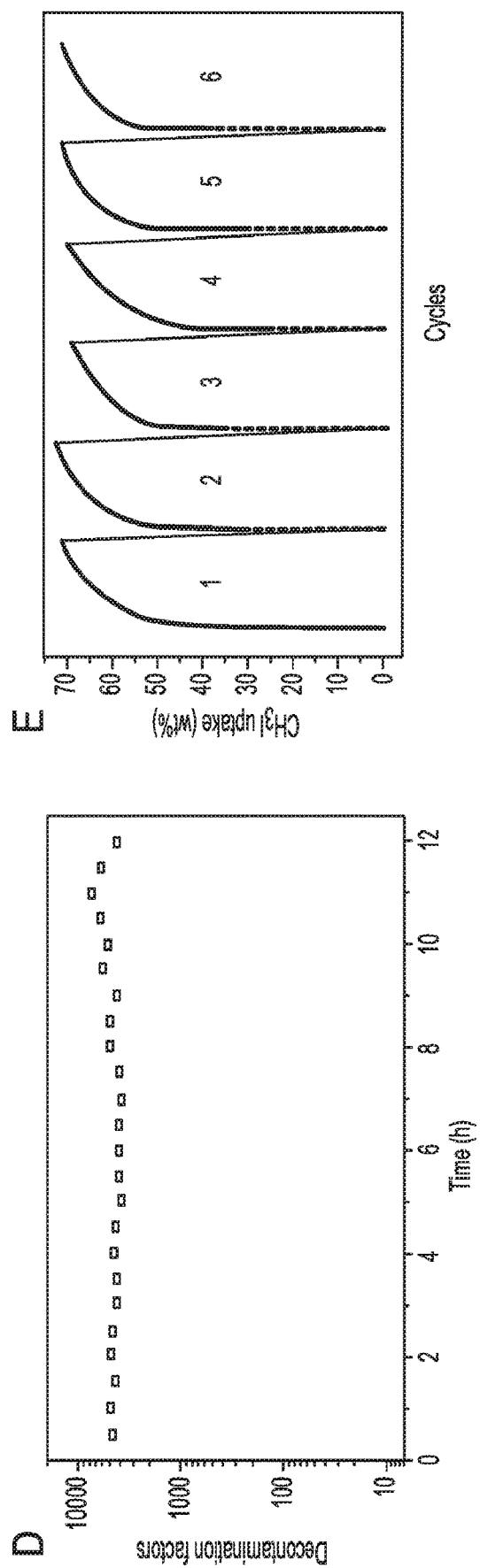

Nuclear processing facilities' regulatory standards require a 'decontamination factor' (DF) of 3000 (99.967% of active species removed) for $CH_3I$ reprocessing, which is defined as the ratio of radioactivity before and after decontamination procedures. To evaluate the efficiency of MIL-101-Cr-TED as a molecular trap for capturing $CH_3I$ from nuclear waste, breakthrough experiments were performed under conditions simulating the gas mixtures produced during $CH_3I$ reprocessing, which include $H_2O$, $HNO_3$, $NO_2$, and NO at 150° C. As shown in FIG. 7D, the DFs of MIL-101-Cr-TED are as high as 3700-7300, which are substantially higher than the reprocessing facility regulatory requirements. This means that about 99.973-99.986% $CH_3I$ can be removed by MIL-101-Cr-TED under such conditions. The result further illustrates that the MOF-based molecular traps are highly suitable for ROIs capture from nuclear waste off-gas mixtures.

Figure 8:
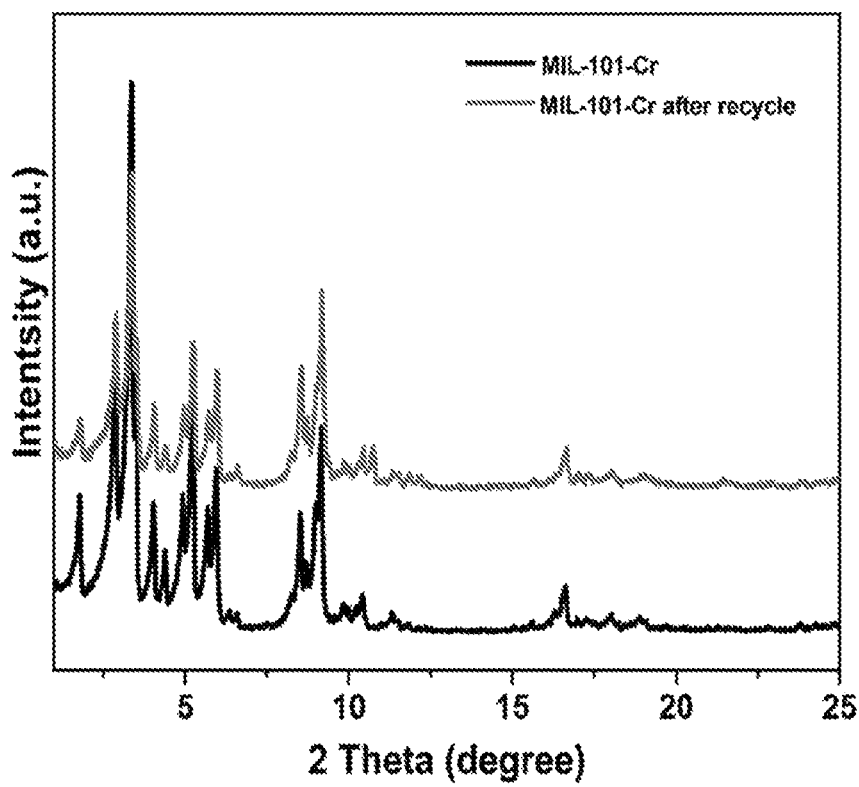
FIG. 8 illustrates the PXRD patterns of MIL-101-Cr and MIL-101-Cr after recycle.
Figure 9:
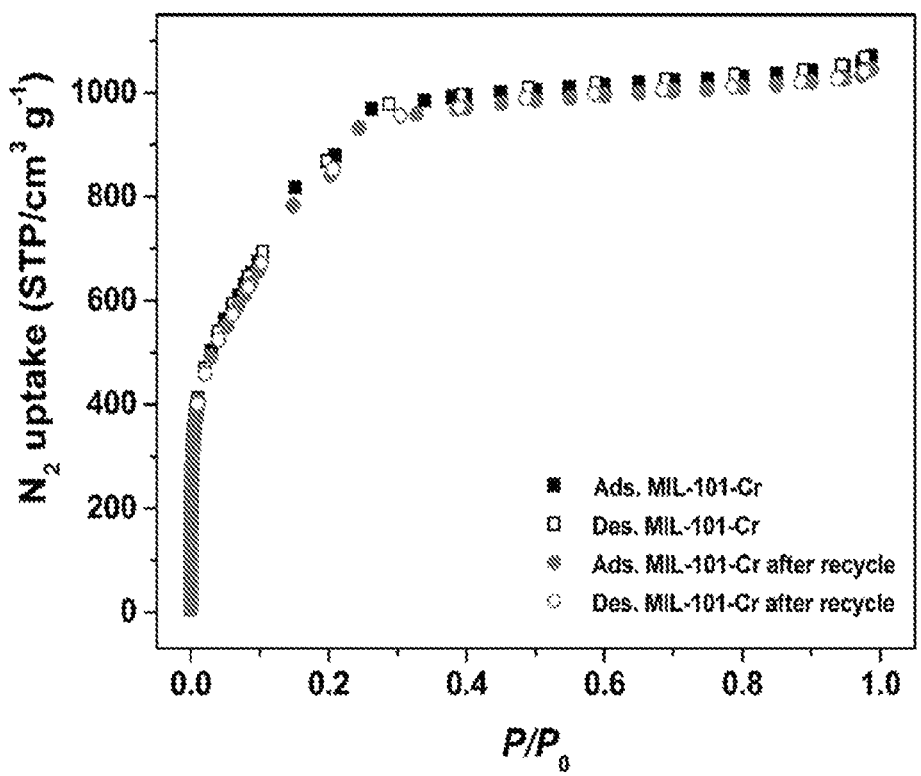
FIG. 9 illustrates the 77K $N_2$ sorption isotherms of MIL-101-Cr and MIL-101-Cr after recycle.
Figure 10:
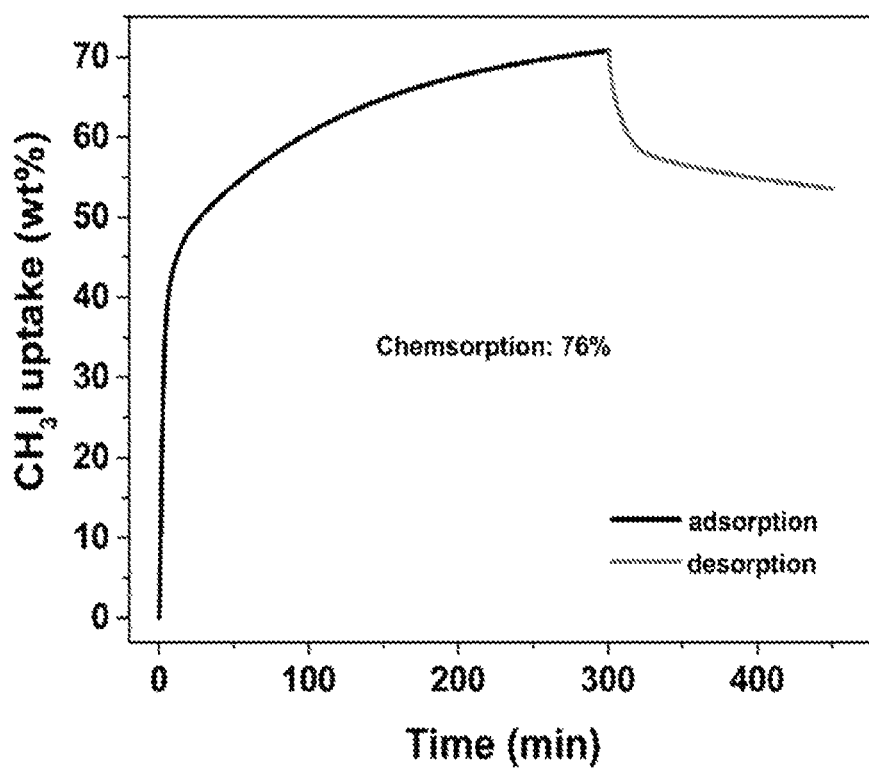
FIG. 10 illustrates the adsorption and desorption curves of $CH_3I$ for MIL-101-Cr-TED at 150° C. Desorption of $CH_3I$ was performed at 150° C. under 90 mL/min $N_2$ stream.
Figure 11:
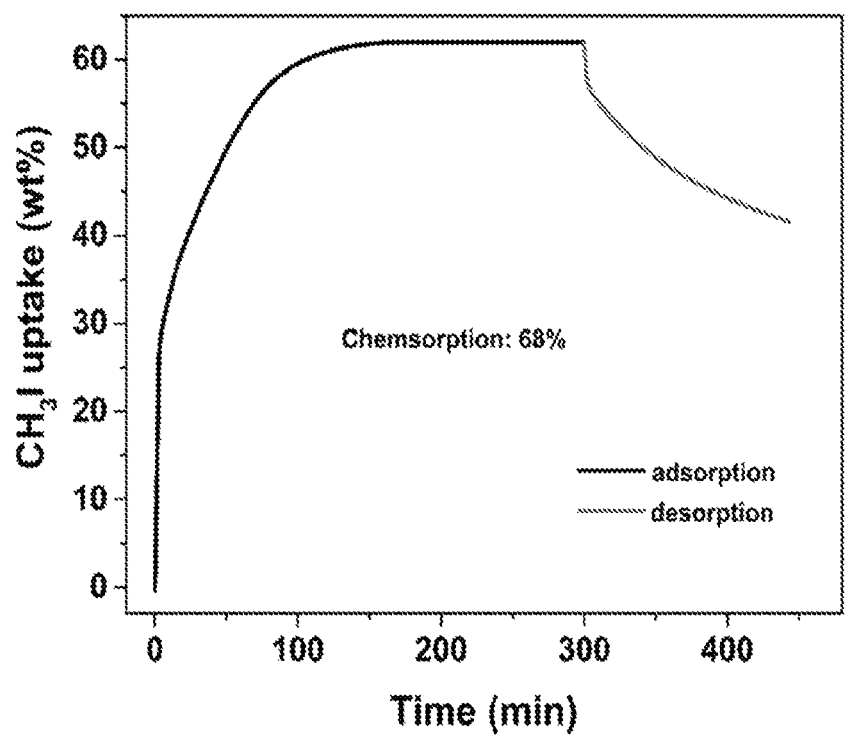
FIG. 11 illustrates the adsorption and desorption curves of $CH_3I$ for MIL-101-Cr-HMTA at 150° C. Desorption of $CH_3I$ was performed at 150° C. under 90 mL/min $N_2$ stream.

After $CH_3I$ adsorption, MIL-101-Cr-TED can be regenerated by washing with 3 M HCl followed by ethanol solution, resulting in complete recovery of MIL-101-Cr (FIGS. 8 and 9). The framework can then be re-functionalized to MIL-101-Cr-TED following the initial procedure. The regenerated MIL-101-Cr-TED retains 100% of the original loading capacity after the five full cycles (FIG. 7E). As silver based adsorbents often suffer from a dramatic loss of adsorption capacity after only a few cycles (e.g. 50% loss for Ag@13X after five cycles), a fully recyclable system was established for ROI capture from nuclear waste that is unprecedented and unattainable by any other known adsorbents. The $CH_3I$ capture cost was estimated for MIL-101-Cr-TED and $Ag^0$@MOR. As shown in Table 1, for each cycle the cost for the latter is 35 times of the former, a significant saving for MIL-101-Cr-TED.

TABLE 1

Comparison of performance and cost of MIL-101-Cr-TED and industrial adsorbent Ag⁰@MOR.

| Material | Stability[a] | Maximum uptake capacity at 150° C. (wt %)[b] | Decrease in uptake capacity under humidity[c] | Nuclear processing facilities' regulatory standards[d] | Full recyclability | Cost ($/g$_{CH_3I}$)[e] |
|---|---|---|---|---|---|---|
| MIL-101-Cr-TED | Yes | 71 wt % | 42.4% | Yes | Yes | 0.29 |
| Ag⁰@MOR | Yes | 16 wt % | 63.7% | Yes | No | 10.2 |

[a] Including both acid stability and thermal stability;
[b] based on adsorption isotherm data;
[c] RH = 81%;
[d] Nuclear processing facilities' regulatory standards require a DF of 3000 (99.967% of active species removed) for CH₃I reprocessing;
[e] The estimated cost is based on the consumption of TED and Ag⁰@MOR, respectively, for a single cycle. The cost of MIL-101-Cr is not included as it is fully recyclable. The uptake amount of CH₃I used for cost calculation is based on the data obtained under humid conditions. The prices used for cost calculations are from Sigma-Aldrich (TED and silver, 500 g/pack) and Alfa Aesar (MOR, 500 g/pack).

The outstanding performance of MIL-101-Cr-TED and MIL-101-Cr-HMTA prompted the investigation of the possible interaction mechanisms between $CH_3I$ molecules and the MOF host. Gas adsorption experiments carried out at 150° C. show evidence of both physisorption and chemisorption for $CH_3I$, but chemisorption is the dominant mode of interaction (76 and 68 wt % for MIL-101-Cr-TED and MIL-101-Cr-HMTA, respectively) at that temperature, with most $CH_3I$ molecules being chemically trapped within the framework.

Incorporating tertiary amine molecules within MIL-101-Cr gives rise to function-adjustable ROI molecular traps with record-high uptake capacities for ROI capture from nuclear waste. In addition, these molecular traps exhibit excellent recyclability, which is not available for any currently known industrial adsorbents. Coupled with its exceptionally high chemical and thermal stability, high efficiency, and low cost, such molecular traps offer significant promise for ROI capture from nuclear waste.

Materials and measurements. Commercially available reagents were purchased in high purity and used without further purification. Powder X-ray diffraction (PXRD) data were collected on a Rigaku Ultima-IV diffractometer or a Bruker AXS D8 Advance A25 Powder X-ray diffractometer. $N_2$ gas sorption experiments were carried out on a Micromeritics 3Flex volumetric adsorption analyzer. Elemental analyses were performed on a Perkin-Elmer 2400 element analyzer. Thermogravimetric analysis (TGA) was analyzed by a Q5000 thermogravimetric analyzer. UV-Vis data were collected using a Shimadzu UV-3600 spectrophotometer. HRTEM-EDS analysis was performed in a FBI Tecnai G2 S-Twin with a field emission gun operating at 200 kV. Images were acquired digitally on a Gatan multiple CCD camera. The FBI Tecnai G2S-Twin is equipped with an EDS detector, which was used for elemental analysis of the nanocrystal composition. The $^1H$ NMR data was collected on a Bruker AVANCE IIIHD console with 1.9 mm MAS probe. ICP was performed on a Perkin-Elmer Elan DRC II Quadrupole Inductively Coupled Plasma Mass Spectrometer (ICP-MS) analyzer. $CH_3I$ adsorption experiments were carried out on a homemade gravimetric adsorption analyzer modified from a Thermogravimetric Analyzer Q50 (TA Instruments).

Synthesis of MIL-101-Cr. MIL-101-Cr was synthesized according to the reported procedure with minor modifications. Typically, a solution containing chromium(III) nitrate $Cr(NO_3)_3 \cdot 9H_2O$ (800 mg, 2.0 mmol), $HNO_3$ (2.0 mmol), benzene-1,4-dicarboxylic acid (328 mg, 2.0 mmol), and 10 mL $H_2O$ was transferred to the PTFE/Teflon liner in a hydrothermal autoclave which was heated at 210° C. for 8 h and cooled afterwards slowly to room temperature. The solid product was isolated as a green powder by centrifugation and washed three times with DMF, water and ethanol for 12 h at 80° C., respectively. The final product was dried under vacuum at 150° C. for 24 h.

Synthesis of MIL-101-Cr-TED. MIL-101-Cr was synthesized according to previously reported method. A resealable flask was charged with MIL-101-Cr (1.0 g), TED (1.5 g), and benzene (50 mL). The flask was sealed and heated to 110° C. for 3 days. The green solid of MIL-101-Cr-TED was collected after washing the product with dry benzene, and then drying under vacuum at 200° C. for 3 h. Elemental Analysis: C: 47.58%; H: 4.14%; N: 6.38%. ICP: Cr: 16.89%.

Synthesis of MIL-101-Cr-HMTA. A resealable flask was charged with MIL-101-Cr (1.0 g), HMTA (1.5 g), and chloroform (50 mL). The flask was sealed and heated to 110° C. for 3 days. The product was collected, washed with dry chloroform, and then dried under vacuum at 200° C. for 3 h to yield the green solid, MIL-101-Cr-HMTA. Elemental Analysis: C: 44.87%; H: 4.08%; N: 12.15%. ICP: Cr: 15.87%.

Synthesis of Ag⁺@13X. Ag⁺@13X was synthesized according to the previously reported procedure. ICP: Ag: 27.4%.

Synthesis of Ag⁺@ZSM-5. The same synthetic procedure for Ag⁺@13X was used except that zeolite 13X was replaced by ZSM-5. ICP: Ag: 9.71%.

Synthesis of Ag+@MOR. The same synthetic procedure as for Ag+@13X was used except that zeolite 13X was replaced by MOR. Ag: 7.4%.

Synthesis of Ag0@MOR. Ag0@MOR was synthesized by hydrogenation of Ag+@MOR under H2 environment at 200° C. for 12 h (4). ICP: Ag: 7.7%.

Synthesis of TED@AC (5% TED). TED (100 mg) was added into a 100 mL methanol to form a solution. Then commercial AC (1.9 g) was added into the above solution to form a slurry. The mixture was stirred for two days to evaporate all the solvent to obtain the final TED@AC (5).

Synthesis of HMTA@AC (5% HMTA). The same synthetic procedure for TED@AC was used here except that TED was replaced by HMTA.

Example 2

Three amine molecules, N,N-dimethylethylenediamine (DMEDA), N,N-dimethyl-1,3-propanediamine (DMPDA), and N,N-dimethyl-1,4-butanediamine (DMBDA) were selected for MOF functionalization. MIL-101-Cr was synthesized following reported route. MIL-101-Cr-DMEDA, MIL-101-Cr-DMPDA and MIL-101-Cr-DMBDA were obtained by stirring MIL-101-Cr with DMEDA, DMPDA, and DMBDA in extra dry benzene at 110° C. for 24 h in a re-sealed flask under nitrogen atmosphere. Transmission electron microscopy (TEM) images show that sample crystallinity and morphology were well retained after tertiary amine functionalization.

The successful grafting of amine groups onto MIL-101-Cr was also confirmed by powder X-ray diffraction (PXRD). PXRD analysis shows that the diffraction profiles of all three samples remain the same after amine functionalization, indicating that their structures are kept intact. The IR absorption spectra show that the weak bands at 1059, 1045 and 1047 cm$^{-1}$ are associated with the stretching vibration of C—N in DMEDA, DMPDA and DMBDA in MIL-101-Cr-DMEDA, MIL-101-Cr-DMPDA and MIL-101-Cr-DMBDA respectively, but are not present in pristine MIL-101-Cr, confirming the linkage of amine molecules to OMSs of the Cr$_3$O clusters. The presence of nitrogen was further confirmed by N(1 s) core level peak at ~400 eV in XPS spectra of MIL-101-Cr-DMEDA, MIL-101-Cr-DMPDA and MIL-101-Cr-DMBDA samples. Elemental analysis reveals a nitrogen content of 6.48, 6.43 and 6.15 wt % for MIL-101-Cr-DMEDA and MIL-101-Cr-DMPDA, and MIL-101-Cr-DMBDA, respectively. This indicates that all the OMSs of Cr$_3$O clusters are modified by different amine molecules.

The porosity of the amine grafted MIL-101-Cr samples was analyzed based on nitrogen gas adsorption-desorption isotherms collected at 77 K. Brunauer-Emmett-Teller (BET) surface area and pore volume data are summarized in Table 1. Compared to the pristine MOF, the BET values of the amine functionalized MIL-101-Cr are reduced from 3342 m$^2$ g$^{-1}$ to 2287, 2399 and 2323 m$^2$ g$^{-1}$ for MIL-101-Cr-DMEDA, MIL-101-Cr-DMPDA and MIL-101-Cr-DMBDA, respectively. There is also a clear correlation between the chain length of amine molecules and pore volume of the functionalized MOFs. Amines having longer chains take up more space, resulting in smaller pore volume. It is worth noting that despite a decrease in their surface area, all three amine-functionalized samples remain highly porous, with the porosity significantly higher than any other benchmark adsorbent materials used for ROI capture, which usually have a moderate surface area range of ~300-1000 m$^2$ g$^{-1}$.

Thermogravimetric (TG) analysis shows that all amine grafted samples are stable up to 300° C. Isothermal TG analysis performed at 150° C. confirms that all of them withstand prolonged heating without losing weight. The high thermal stability of these compounds warrants their use for nuclear waste treatment at the required elevated working temperature (150° C.).

Methyl iodide sorption. Since the capture of organic iodides from reprocessing off-gas mixtures is typically performed at elevated temperatures (~150° C.), the CH$_3$I uptake capacity was tested at 150° C. for both amine grafted samples and several benchmark materials. At this temperature, MIL-101-Cr-DMEDA, MIL-101-Cr-DMPDA and MIL-101-Cr-DMBDA have a maximum CH$_3$I uptake amount of 80, 72 and 49 wt % at 0.2 atm, respectively. These values are 5.3, 4.8 and 3.3 times of that for Ag$^0$@MOR (15 wt %), a leading adsorbent material in the United States for capturing radioactive organic iodides during nuclear fuel reprocessing. In addition, the capture capacity of MIL-101-Cr-DMEDA is much higher than other benchmark materials such as TED@AC, HMTA@AC, and Ag$^+$@ZSM-5, with uptake amounts of 17, 14, and 24 wt %, respectively. It is also higher than those of triethylenediamine (TED) and hexamethylenetetramine (HMTA) functionalized MIL-101-Cr with an uptake amount of 71 and 62 wt % for MIL-101-Cr-TED and MIL-101-Cr-HMTA, respectively. The added uptake capacity of MIL-101-Cr-DMEDA can be attributed to its higher surface area and pore volume. Compared to the performance of pristine MIL-101-Cr (CH$_3$I uptake: 13 wt %), DMEDA functionalization leads to a remarkable increase of ~6.2 times. This uptake amount is by far the highest value among all materials that have been assessed for CH$_3$I capture from nuclear waste.

Breakthrough experiments. A crucial aspect for a sorbent's performance metrics in real applications is its sustainability towards moisture. To assess the influence of humidity on the organic iodide uptake capacity, we performed column breakthrough tests at 150° C. under dry and humid conditions (RH=81% at 23° C.). For Ag$^+$@13X, the zeolite with the best performance, the uptake drops from 40.3 to 15.3 wt %, a substantial decrease of 62%. A dramatic decrease of 64% was also observed for Ag$^0$@MOR comparing its uptake of 21.2 wt % under dry conditions and 7.7 wt % under humid conditions. For MIL-101-Cr-DMEDA and MIL-101-Cr-DMPDA, however, significantly less effect was found under the same conditions, with a decrease of 30.9% and 26.2%, respectively. These values are also lower than those of MIL-101-Cr-TED and MIL-101-Cr-HMTA (decrease of 42.4% and 40.8%, respectively). These results indicate that MIL-101-Cr-DMEDA and MIL-101-Cr-DMPDA represent the best candidates for real-world applications which are under highly humid environment. Based on the breakthrough data, the uptake capacities of MIL-101-Cr-DMEDA and MIL-101-Cr-DMPDA under humidity are 3.5 and 3.1 times higher than that of Ag$^+$@13X, and 7.3 and 6.5 times of Ag$^0$@MOR at 150° C.

In addition to loading capacity, another important matric to measure the efficiency of a given adsorbent is decontamination factor (DF), which relates to the percentage removal of the activity of a radionuclide. To obtain DF values for MIL-101-Cr-DMEDA and MIL-101-Cr-DMPDA, breakthrough experiments was performed on a gas mixture that mimics the composition during nuclear reprocessing of used (spent) fuel. The mixture includes CH$_3$I, H$_2$O, HNO$_3$, NO$_2$, and NO at 150° C. The DF values are 4100-5000 and 4100-4400 for MIL-101-Cr-DMEDA and MIL-101-Cr-DMPDA, respectively, which are significantly higher than that of the reprocessing facility regulatory requirement (DF=3000). This means that at least 99.98% CH$_3$I can be removed by MIL-101-Cr-DMEDA and MIL-101-Cr-DMPDA under such conditions. These results suggest that both MIL-101-Cr-DMEDA and MIL-101-Cr-DMPDA meet all four performance metrics for CH$_3$I capture: high loading capacity, low penetration, high efficiency and high CFs.

The recyclability of MIL-101-Cr-DMEDA was evaluated after CH$_3$I adsorption. The sample was treated by concentrated HCl and ethanol solution, which resulted in completely recovery of MIL-101-Cr. The recovered MOF sample can then be re-functionalized again to form MIL-101-Cr-DMEDA. The regenerated MIL-101-Cr-DMEDA retained 100% of the original loading capacity after the three cycles.

Synthesis of MIL-101-Cr-DMEDA.

MIL-101-Cr was synthesized according to previously reported method. (Zhao, T. et al. High-yield, fluoride-free and large-scale synthesis of MIL-101(Cr). *Dalton Transactions* 44, 16791-16801, doi:10.1039/c5dt02625c (2015). A resealable flask was charged with MIL-101-Cr (1.0 g), DMEDA (1.5 g), and benzene (50 mL). The flask was sealed and heated to 110° C. for 3 days. The resulting solid was collected, washed with dry benzene, and then dried under vacuum at 200° C. for 3 h to produce the green solid, MIL-101-Cr-DMEDA. Elemental Analysis: C: 44.52%; H: 4.34%; N: 6.48%. ICP: Cr: 18.29%.

Synthesis of MIL-101-Cr-DMPDA.

A similar procedure was used by replacing DMPDA with DMEDA. Elemental Analysis: C: 45.87%; H: 4.68%; N: 6.43%. ICP: Cr: 17.67%.

Synthesis of MIL-101-Cr-DMBDA.

A similar procedure was used where DMEDA was replaced by DMBDA. Elemental Analysis: C: 47.32%; H: 4.78%; N: 6.15%. ICP: Cr: 17.17%.

Methyl Iodide Adsorption Experiments.

For a typical CH$_3$I adsorption measurement, ~20 mg MOF sample was loaded and activated at 200° C. for 2 hours under N$_2$ flow to ensure complete removal of residue solvents in the pores. The temperature was then reduced to 150° C. and the gas flow was switched from pure N$_2$ to a combination of pure N$_2$ and another N$_2$ gas stream passing through a CH$_3$I bubbler. The flow rates of the two gas streams were controlled via two gas flow controllers to achieve a partial pressure of 0.2 atm for CH$_3$I. The adsorption amount was monitored by recording the sample weight.

Porosity characterization experiments. Nitrogen adsorption experiments were carried out at 77 K to characterize the porosity of various samples using a Micromeritics 3Flex adsorption analyzer. Nitrogen gas of ultra-high purity was used in the measurements. For each experiment, 50 mg of sample was activated at 150° C. under dynamic vacuum overnight prior to adsorption measurement. The BET surface area, pore volume, and BJH pore size distribution are derived from the adsorption isotherms (see Table 2 and FIG. X (S1†)).

mm I.D.×150 mm) with silane treated glass wool filling the void space. A helium flow (5 cm$^3$ min$^{-1}$) was used to purge the adsorbent. The flow of He was then turned off while dry N$_2$ at a rate of 5 mL min$^{-1}$ bubbled through CH$_3$I and was allowed to flow into the column. The flow rate of CH$_3$I was 8.872 mg min$^{-1}$ (1.4 cm$^3$ min$^{-1}$), determined through trial and error. The experiment was run in the stable system without any sample and the flow rate of CH$_3$I weighed by mass difference. The effluent from the column was monitored using an online mass spectrometer (MS). Experiments in the presence of humidity were performed by injecting water into the gas mixture at a rate of 0.12 µL min$^{-1}$ using a Fusion 100 syringe pump at 20° C., keeping other conditions the same.

The absolute adsorbed amount of gas i (q$_i$) is calculated from the breakthrough curve by the equation:

$$q_i = \frac{F_i \times t_0 - V_{dead} - \int_0^{t_0} F_e \Delta t}{m}$$

where F$_i$ is the influent flow rate of the specific gas (cm$^3$ min$^{-1}$); t$_0$ is the adsorption time (min); V$_{dead}$ is the dead volume of the system (cm$^3$); F$_e$ is the effluent flow rate of the specific gas (cm$^3$ min$^{-1}$); and m is the mass of the sorbent (g).

It will be understood by those of skill in the art that numerous and various modifications can be made without departing from the spirit of the present invention. Therefore, it should be understood that the various embodiments of the present invention described herein are illustrative only and not intended to limit the scope of the present invention.

The invention claimed is:
1. A complex comprising
a) a compound of Formula M$_3$(O)X$_b$[(O$_2$C)—Y—(CO$_2$)]$_3$(Z)$_c$, wherein
M is a transition metal with an oxidation state of +3 or +4;
Y is an optionally substituted aryl or heteroaryl;
X is an anion having 1 or 2 negative charges;
Z is a neutral molecule capable of coordinating to M;
b is 1 or 2;
c is 0 or 1;
and
b) one or more nitrogen-containing functional molecules, wherein said one or more functional molecules each contain at least two nitrogens, and one of said at least two nitrogens is coordinated to the M, wherein said one or more functional molecules independently have a formula of R$^1$R$^2$NLNR$^3$R$^4$,

TABLE 2

Adsorption summary of pristine and amine grafted MIL-101-Cr

| Compound | BET surface area (m$^2$ g$^{-1}$) | Pore volume (cm$^3$ g$^{-1}$) | CH$_3$I uptake$^a$ (wt %) | | |
|---|---|---|---|---|---|
| | | | Total | Physisorbed$^b$ | Chemisorbed$^c$ |
| MIL-101-Cr | 3429.2 | 1.729 | 13.5 | 11.6 | 1.9 |
| MIL-101-Cr-DMEDA | 2459.8 | 1.191 | 79.6 | 40.8 | 38.8 |
| MIL-101-Cr-DMPDA | 2372.6 | 1.105 | 72.1 | 35.0 | 37.1 |
| MIL-101-Cr-DMBDA | 2217.9 | 1.064 | 48.6 | 16.2 | 32.4 |

$^a$Temperature = 150° C. and CH$_3$I partial pressure = 0.2 atm.
$^b$The amount of chemisorption was estimated from the desorption branch of the isotherm.
$^c$The remaining part after desorption was attributed to chemisorption.

Breakthrough Experiments with or without Humidity.

The breakthrough experiment was conducted using a lab-scale fixed-bed reactor at 150° C. In a typical experiment, the powder sample was activated at 150° C. for 3 h. Then 1.0 g of material was packed into a quartz column (5.8 wherein
each of $R^1$, $R^2$, $R^3$ and $R^4$ is independently selected from the group consisting of H, methyl, ethyl, propyl, and isopropyl, L is (i) void, or (ii) a $C_{1-4}$ linker optionally substituted with a $C_{1-4}$ alkyl, wherein $R^1$ and $R^3$ and/or $R^2$ and $R^4$ link up to form a $C_{2-4}$ alkyl chain, wherein each of said $C_{2-4}$ alkyl chain optionally and independently has a carbon replaced with a heteroatom or group selected from the group consisting of $NR^5$, S, and O, wherein $R^5$ is H or $C_{1-4}$ alkyl, or two $R^5$ link up to form a $C_{1-2}$ alkyl chain.

2. The complex of claim 1, wherein b is 1.

3. The complex of claim 1, wherein c is 0, wherein two functional molecules are coordinated to $M_3$ cluster in the Formula $M_3(O)X_b[(O_2C)-Y-(CO_2)]_3(Z)_c$.

4. The complex of claim 1, wherein the M is selected from the group consisting of Cr, Mo, Fe, Al, Zr and Ti.

5. The complex of claim 1, wherein the M is a +3 oxidation state metal selected from the group consisting of Cr, Mo, Fe, and Al, and Y is optionally substituted with a substituent selected from the group consisting of $-OR^1$, $-SR^1$, $-SR^1$, $-C_1$-$C_4$ alkyl, $-NO_2$, $-CN$ and $-NR^aR^b$, wherein $R^1$ at each occurrence is independently hydrogen (H) or $C_1$-$C_4$ alkyl, and $R^a$ and $R^b$ are independently hydrogen, or $C_1$-$C_4$ alkyl.

6. The complex of claim 1, wherein M is $Cr^{3+}$.

7. The complex of claim 1, wherein the complex is a porous crystalline material.

8. The complex of claim 1, wherein $R^1$ and $R^3$ and/or $R^2$ and $R^4$ link up to form a $C_{2-4}$ alkyl chain.

9. The complex of claim 1, wherein L is void and each of $R^1$, $R^2$, $R^3$, and $R^4$ is independently H or methyl.

10. The complex of claim 1, wherein L is a $C_2$ linker.

11. The complex of claim 1, wherein L is a $C_2$ linker, and $R^1$ and $R^3$ link up to form a $C_2$ linker.

12. The complex of claim 1, wherein said one or more functional molecules each contain at least two tertiary amines.

13. The complex of claim 1, wherein said one or more functional molecules each contains at least one tertiary amine and at least one primary or secondary amine.

14. The complex of claim 1, wherein said one or more functional molecules are selected from the group consisting of triethylenediamine (TED), and hexamethylenetetramine (HMTA).

15. The complex of claim 1, wherein said one or more functional molecules are selected so that the complex has an average pore diameter between about 10 Å and 21 Å.

16. The complex of claim 1, wherein said one or more functional molecules are selected so that the complex is stable at a temperature above 150° C. for more than 10 hours.

17. The complex of claim 1, wherein said one or more functional molecules are selected so that the complex has a Brunauer-Emmett-Teller (BET) surface area ranging from about 2200 $m^2$ $g^{-1}$ to about 3500 $m^2$ $g^{-1}$.

18. The complex of claim 1, wherein said one or more functional molecules are selected so that the complex has a decontamination factor of more than about 3500.

19. The complex of claim 1, wherein said one or more functional molecules are selected so that the complex has an uptake capacity of more than about 50 wt % for radioactive iodide.

20. The complex of claim 1, wherein said one or more functional molecules are selected so that the uptake capacity decreases by less than about 35% when relative humidity is increased from less than about 20% to more than about 70%.

* * * * *

UNITED STATES PATENT AND TRADEMARK OFFICE
CERTIFICATE OF CORRECTION

| | |
|---|---|
| PATENT NO. | : 11,406,961 B2 |
| APPLICATION NO. | : 16/472987 |
| DATED | : August 9, 2022 |
| INVENTOR(S) | : Jing Li and Baiyan Li |

It is certified that error appears in the above-identified patent and that said Letters Patent is hereby corrected as shown below:

In the Claims

Column 20, Line 13, in Claim 14, after the text "(HMTA)" insert the following:
--, N,N-dimethylethylenediamine (DMEDA), N,N-dimethyl-1,3- propanediamine (DMPDA) and N,N-dimethyl-1,4-butanediamine (DMBDA)--.

Signed and Sealed this
Thirtieth Day of May, 2023

Katherine Kelly Vidal
*Director of the United States Patent and Trademark Office*